US012685948B2

(12) United States Patent
Smith et al.

(10) Patent No.:    US 12,685,948 B2
(45) Date of Patent:         Jul. 21, 2026

(54) SYSTEMS AND ADSORPTION FILTERS FOR FILTERING PARTICULATE MATTER FROM FLUID STREAMS

(71) Applicants: Stevie Horton Smith, Galveston, TX (US); Travis McGee, Angleton, TX (US); Jon Leslie Howe, Texas City, TX (US); Dan Faust, League City, TX (US); Annette B. Crabtree Smith, Galveston, TX (US); Justin Smith, Missouri City, TX (US)

(72) Inventors: Stevie Horton Smith, Galveston, TX (US); Travis McGee, Angleton, TX (US); Jon Leslie Howe, Texas City, TX (US); Dan Faust, League City, TX (US); Annette B. Crabtree Smith, Galveston, TX (US); Justin Smith, Missouri City, TX (US)

( * ) Notice:     Subject to any disclaimer, the term of this patent is extended or adjusted under 35 U.S.C. 154(b) by 637 days.

(21) Appl. No.: 18/190,256

(22) Filed:     Mar. 27, 2023

(65)              Prior Publication Data

US 2023/0311025 A1      Oct. 5, 2023

Related U.S. Application Data

(60) Provisional application No. 63/326,725, filed on Apr. 1, 2022.

(51) Int. Cl.
     *B01D 15/00*          (2006.01)
(52) U.S. Cl.
     CPC .................................. *B01D 15/00* (2013.01)
(58) Field of Classification Search
     CPC ...... B01D 29/46; B01D 29/52; B01D 29/055; B01D 37/02; B01D 46/0005; B01D 15/00;

(Continued)

(56)              References Cited

U.S. PATENT DOCUMENTS 6,325,834 B1 *   12/2001   Fonseca ................ F01N 3/2053
                                                  422/177
2005/0178704 A1 *   8/2005   Prochaska .............. B01D 29/46
                                                  210/488

FOREIGN PATENT DOCUMENTS

WO       WO-2021185583 A1 *   9/2021   ......... F16D 65/0031

* cited by examiner

*Primary Examiner* — Qianping He
(74) *Attorney, Agent, or Firm* — CONLEY ROSE, P.C.

(57)              ABSTRACT

An adsorption filter for removing particulate matter from a fluid includes an outer housing including an upper end, a lower end, and an inner cavity. In addition, the adsorption filter includes a filter assembly disposed in the inner cavity of the outer housing. The filter assembly includes a supply conduit having an inlet end, an outlet end disposed in the inner cavity, and a linear section extending vertically from the outlet end. The supply conduit is configured to flow the fluid into the inner cavity. Further, the filter assembly includes a first pair of filter discs mounted to the linear section of the supply conduit. The first pair of filter discs includes an upper filter disc and a lower filter disc positioned below the upper filter disc. Each filter disc includes a base and a plurality of parallel flow diverters extending from the base. Each base and each flow diverter slidingly engages an inner surface of the outer housing. Each base includes a flow orifice extending vertically therethrough. The flow diverters of the upper filter disc extend downward from the base of the upper filter disc and the flow diverters of the lower filter disc extend upward from the base of the lower filter disc. The flow diverters of the upper filter disc intermesh with the flow diverters of the lower filter disc. An outer surface of each base and an outer surface of each flow diverter is coated in an adhesive configured to capture the particulate matter.

20 Claims, 7 Drawing Sheets

(58) Field of Classification Search
CPC ............ B01D 2201/0446; B01D 29/01; B01D
39/00; B01D 46/0036; B01D 46/64;
B01D 29/39; B01D 2275/202; B01D
33/215; B01D 33/23; B01D 45/14
USPC .......................................................... 95/90
See application file for complete search history.

SYSTEMS AND ADSORPTION FILTERS FOR FILTERING PARTICULATE MATTER FROM FLUID STREAMS

CROSS-REFERENCE TO RELATED APPLICATIONS

This application claims benefit of U.S. provisional patent application Ser. No. 63/326,725 filed Apr. 1, 2022, and entitled "Systems and Adsorption Filters for Filtering Particulate Matter from Fluid Streams," which is hereby incorporated herein by reference in its entirety for all purposes.

STATEMENT REGARDING FEDERALLY SPONSORED RESEARCH OR DEVELOPMENT

Not applicable.

BACKGROUND

The present disclosure relates generally to systems and methods for analyzing fluid samples. More particularly, the present disclosure relates to systems and methods for removing particulate solids from gases in hydrocarbon fluid sample streams to condition the gases for subsequent analyses.

In refineries and chemical plants, analytical instrumentation is employed at different stages to analyze the composition of the various fluids being processed. In most cases, a small sample of fluid is taken from a process stream and routed to the instrumentation that performs the analysis. Depending on the type of instrumentation and analysis, the fluid sample may need to be "conditioned" before entering the instrumentation to remove liquids, contaminants, and/or particulate solids that may otherwise harm the instrumentation or negatively influence the analytical results (e.g., skew the analytical results such as product yield results).

BRIEF SUMMARY OF THE DISCLOSURE

Embodiments of adsorption filters for removing particulate matter from fluids are disclosed herein. In one embodiment, an adsorption filter comprises an outer housing including an upper end, a lower end, and an inner cavity. The adsorption filter also comprises a filter assembly disposed in the inner cavity of the outer housing. The filter assembly comprises a supply conduit having an inlet end, an outlet end disposed in the inner cavity, and a linear section extending vertically from the outlet end. The supply conduit is configured to flow the fluid into the inner cavity. Further, the filter assembly comprises a first pair of filter discs mounted to the linear section of the supply conduit. The first pair of filter discs includes an upper filter disc and a lower filter disc positioned below the upper filter disc. Each filter disc includes a base and a plurality of parallel flow diverters extending from the base. Each base and each flow diverter slidingly engages an inner surface of the outer housing. Each base includes a flow orifice extending vertically therethrough. The flow diverters of the upper filter disc extend downward from the base of the upper filter disc and the flow diverters of the lower filter disc extend upward from the base of the lower filter disc. The flow diverters of the upper filter disc intermesh with the flow diverters of the lower filter disc. An outer surface of each base and an outer surface of each flow diverter is coated in an adhesive configured to capture the particulate matter.

In another embodiment, an adsorption filter for removing particulate matter from a fluid comprises an outer housing having a vertically oriented central axis, an upper end, a lower end opposite the upper end, and an inner cavity. The adsorption filter also comprises a filter assembly disposed in the inner cavity of the outer housing. The filter assembly comprises a supply conduit having an outlet end disposed in the inner cavity and a linear section extending axially from the outlet end. The supply conduit is configured to flow the fluid into the inner cavity. The filter assembly also comprises a plurality of axially spaced pairs of filter discs mounted to the linear section of the supply conduit. Each pair of filter discs includes an upper filter disc and a lower filter disc positioned below the upper filter disc. Each filter disc includes a base and a plurality of parallel flow diverters extending from the base. Each base has a radially outer cylindrical surface that slidingly engages a radially inner cylindrical surface of the outer housing. Each base includes a flow orifice extending axially therethrough. The flow orifice of each upper filter disc is angularly spaced from the flow orifice of the corresponding lower filter disc relative to the central axis. Each flow diverter has a first end and a second end opposite the first end. The first end of each flow diverter is contiguous with the radially outer surface of the corresponding base and slidingly engages a radially inner cylindrical surface of the outer housing and the second end of each flow diverter is contiguous with the radially outer surface of the corresponding base and slidingly engages a radially inner cylindrical surface of the outer housing. The flow diverters of each upper filter disc extend axially from a lower surface of the corresponding base and the flow diverters of each lower filter disc extend upward from an upper surface of the corresponding base. The flow diverters of the upper filter disc of each pair of filter discs intermesh with the flow diverters of the lower filter disc of the pair of filter discs. The upper surface and the lower surface of each base is coated with an adhesive configured to capture the particulate matter. Each flow diverter is coated with an adhesive configured to capture the particulate matter.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
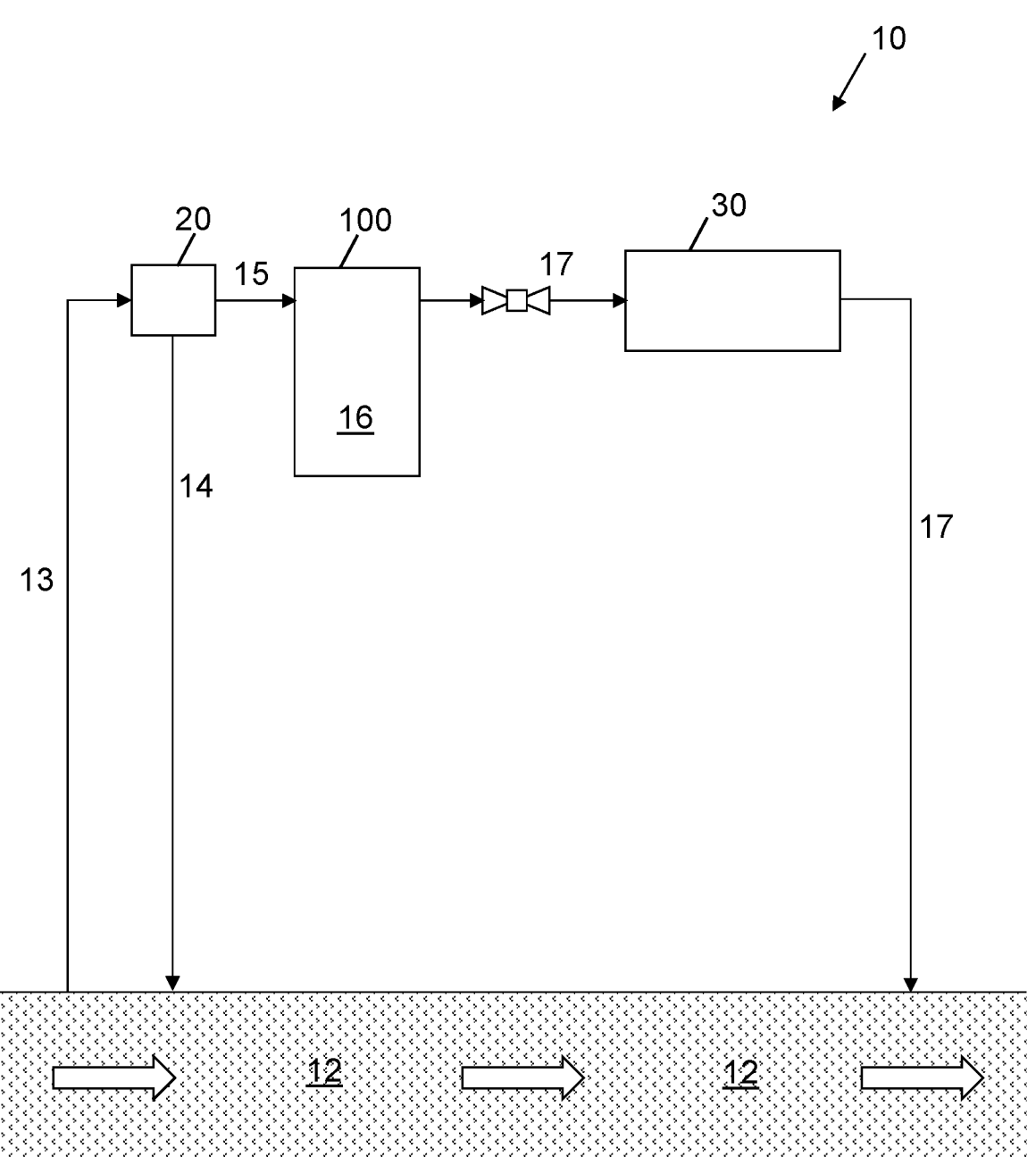
FIG. 1 is a schematic view of an embodiment of a system in accordance with the principles described herein for sampling a bulk chemical or hydrocarbon fluid stream.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (for example, central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (plus or minus 10%) of the recited value. Thus, for example, a recited angle of "about 80 degrees" refers to an angle ranging from 72 degrees to 88 degrees.

As previously described, samples of fluid taken from a process stream for analysis are often conditioned before being routed to instrumentation that performs the analysis. In some sampling systems, particulate matter is filtered out of the fluid sample upstream of the instrumentation to prevent the particulate solids from contaminating and/or damaging the instrumentation. One conventional approach for removing particulate matter from gaseous fluid samples is to bubble the fluid sample through mineral oil, which captures much of the particulate matter via gravity and adhesion. However, this conventional approach can also undesirably and inadvertently remove heavier compounds (e.g., hydrocarbons such as hexane) that are not contaminants and are intended to be passed to downstream instrumentation for analysis. Accordingly, embodiments described herein are directed to devices and methods for removing particulate matter from fluid sample streams without inadvertently removing heavier hydrocarbons (or other fluids) that are not considered contaminants.

Referring now to FIG. 1, an embodiment of a system 10 for sampling and analyzing a bulk fluid stream 12 is shown. The bulk fluid stream 12 is sampled and analyzed with system 10 to provide insight into the processing operation. For example, in a hydrocarbon cracking operation, the fluid stream 12 may be a bulk decoke fluid stream that is sampled and analyzed to determine the yield of one or more desired products (e.g., the volume of ethylene or propylene produced by the cracking process per unit time). In general, fluid stream 12 can be any hydrocarbon or chemical fluid stream for which compositional analysis is desired. In this exemplary embodiment, stream 12 is a hydrocarbon fluid stream such as a decoke or green oil fluid stream within a hydrocarbon cracking or pyrolysis operation.

In this embodiment, system 10 includes a sample conditioner 20, a filter 100 downstream of conditioner 20, and analytical equipment or instrumentation 30 downstream from filter 100. System 10 pulls a sample 13 from the bulk fluid stream 12. When sample 13 is initially pulled from the process fluid stream 12, it may contain a mixture of gas 17 to be analyzed, undesirable fluid contaminants 14, and undesirable particulate matter 16, which can foul and/or damage the downstream instrumentation 30, negatively impact the accuracy of analytical results produced by instrumentation 30, or combinations thereof. Accordingly, in system 10, sample 13 is routed to sample conditioner 20, which removes fluid contaminants 14 from sample 13 and outputs a partially conditioned sample 15. Next, the partially conditioned sample 15 is supplied to filter 100, which removes and captures particulate matter 16 from partially conditioned sample 15 and outputs gas 17. The gas 17 remaining after removal of fluid contaminants 14 by conditioner 20 and after removal of particulate matter 16 by filter 100 may also be referred to as "conditioned" gas 17. The conditioned gas 17 is supplied to analytical instrumentation 30 for analysis. Analytical instrumentation 30 analyzes the conditioned gas 17 to determine one or more characteristics of the conditioned gas 17 (e.g., the composition of gas 17, the yield rate of gas 17, etc.), which is communicated to the plant operators. Thus, conditioner 20 removes fluid contaminants 14 from sample 13 and filter 100 removes particulate matter 16 from the partially conditioned sample 15 output by conditioner 20. In this embodiment, the fluid contaminants 14 are fed back to the bulk fluid stream 12 and the particulate matter 16 is captured within filter 100, which can be periodically serviced and cleaned to remove the captured particulate matter 16. After analysis, the conditioned gas 17 is fed from instrumentation 30 back into bulk fluid stream 12.

Although only one system 10 and associated conditioner 20 and filter 100 are shown in FIG. 1, it should be appreciated that more than one system 10, more than one fluid conditioner 30, more than one filter 100, or combinations thereof can be employed in a chemical or hydrocarbon processing operation to sample fluid and condition the sampled fluids at different stages or locations along the processing operation. In addition, although filter 100 is provided downstream of conditioner 20 in this embodiment of system 10, in other embodiments, the adsorption filter (e.g., filter 100) is provided upstream of the conditioner (e.g., conditioner 20). For example, in one embodiment, the adsorption filter is provided at or proximal the tap where the sample (e.g., sample 13) is pulled from the bulk fluid stream (e.g., bulk fluid stream 12).

As previously described, system 10 can be used in connection with any suitable chemical or hydrocarbon processing operation to separate fluid contaminants 14 and particulate matter 16 from sample 13 to produce conditioned gas 17 prior to analysis by instrumentation 30. In one exemplary embodiment, system 10 is employed to condition a fluid sample from a hydrocarbon stream operation to determine the concentration of an analyte to be measured. In such embodiments, fluid sample 13 is an unconditioned fluid or gas stream comprising fluid contaminants 14 such as water and relatively heavy hydrocarbons (i.e., hydrocarbon molecules having seven or more carbon atoms), small quantities of particulate matter 16 such as aluminum oxide particles and catalyst fines, and the conditioned gas 17 including relatively light hydrocarbons (i.e., hydrocarbons molecules having six or less carbon atoms such as ethylene, propylene, methane, ethane, propane, hexane), hydrogen, carbon-monoxide, and carbon-dioxide.

Figure 2:
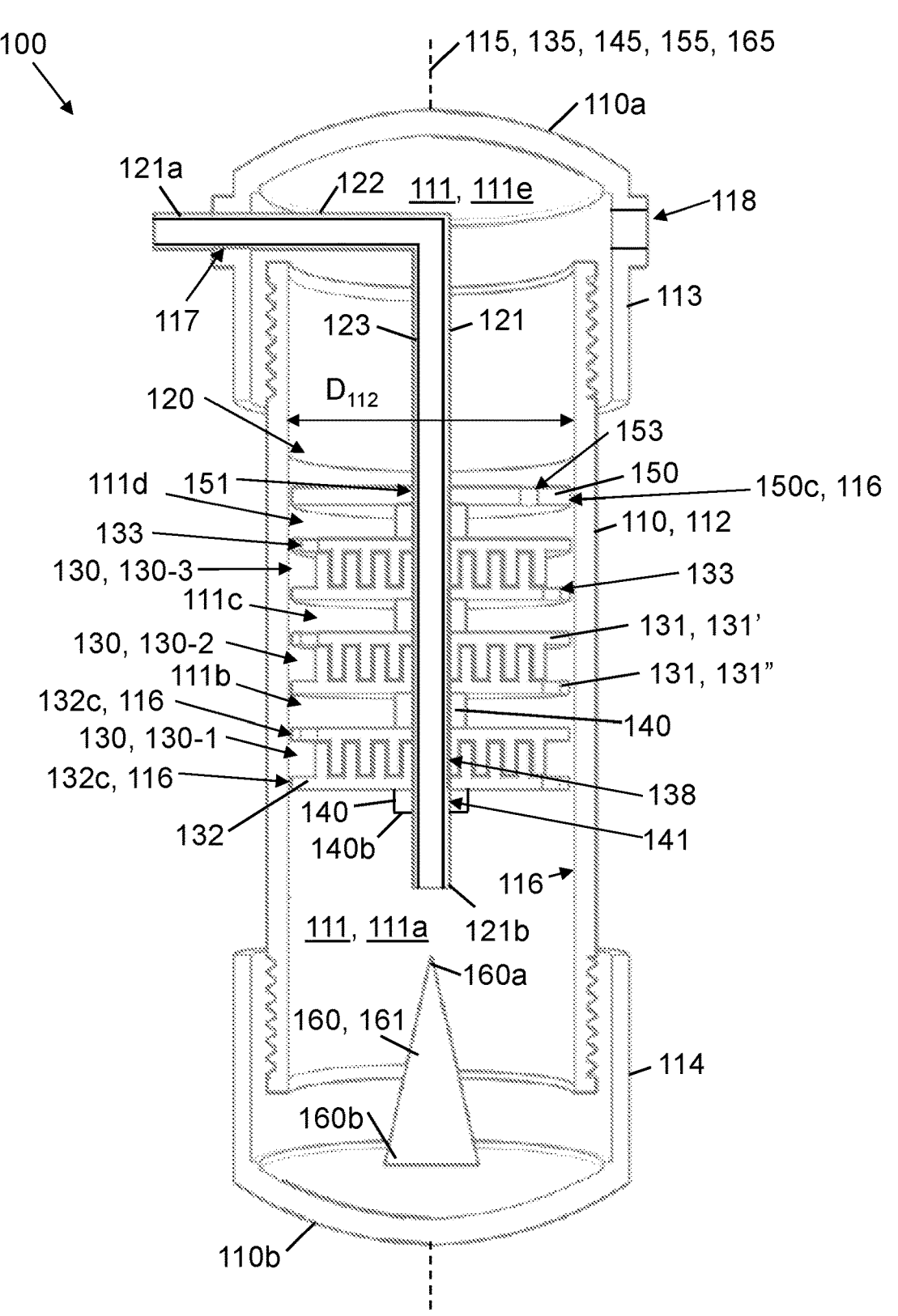
FIG. 2 is a cross-sectional side view of the adsorption filter of FIG. 1.
Figure 3:
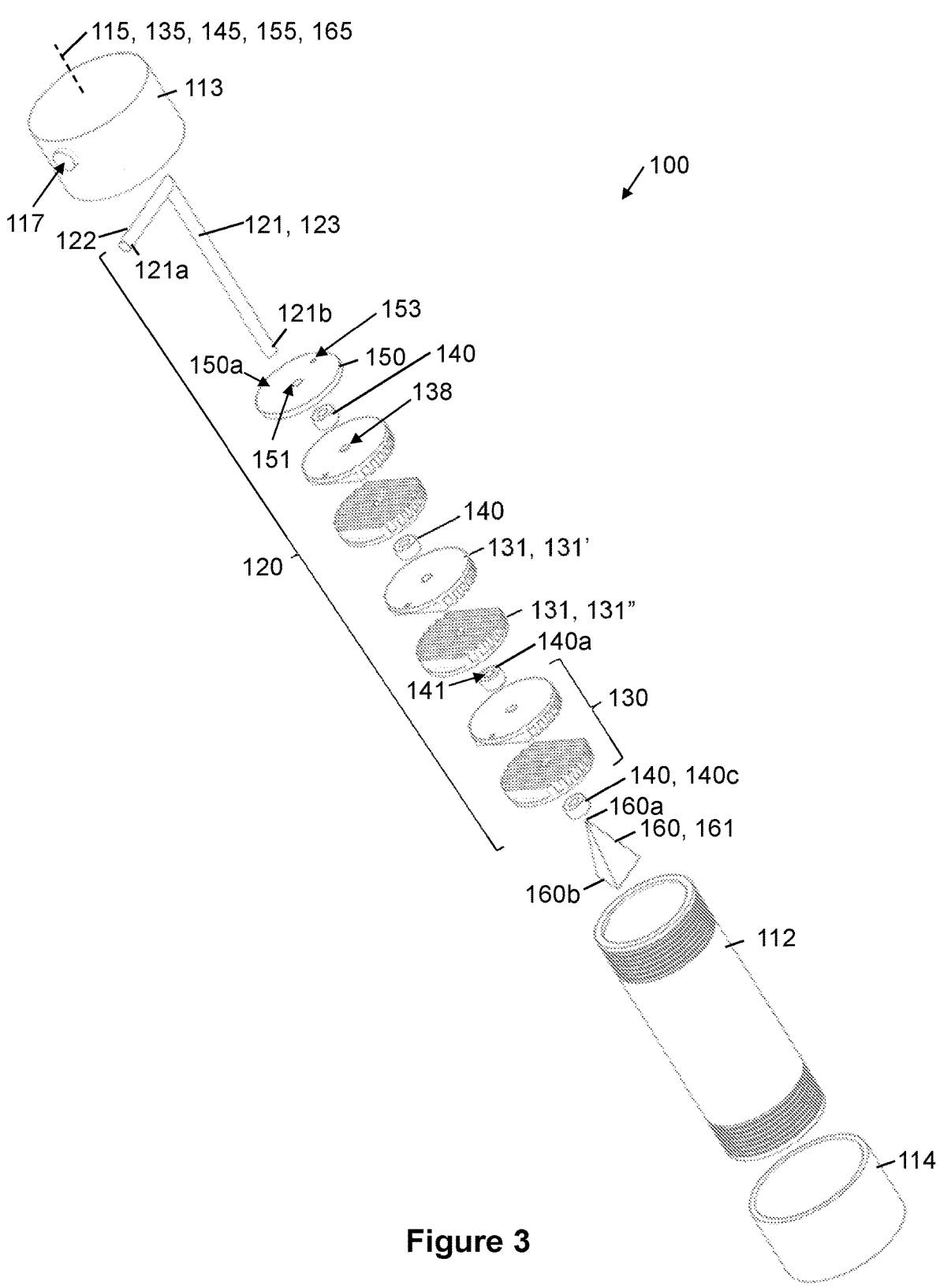
FIG. 3 is a perspective, exploded view of the adsorption filter of FIG. 1.

Referring now to FIGS. 2 and 3, in this embodiment, filter 100 includes an outer housing 110, a filter assembly 120 removably disposed in outer housing 110, and a diffuser 160 disposed in outer housing 110. As will be described in more detail below, the inner surfaces of outer housing 110 (and subcomponents thereof) and the outer surfaces of filter assembly 120 (and subcomponents thereof) are coated with a non-volatile adhesive that captures and retains particulate matter 16 that contacts these surfaces as sample 13 flows through filter 100. In general, any suitable non-volatile adhesive may be used to coat the inner surfaces of outer housing 110 and the outer surfaces of filter assembly 120, however, in embodiments described herein the non-volatile adhesive is a polybutene based adhesive such as Olson Stiky Stuff available from Olson Products, Inc. of Medina, Ohio, USA. It is to be understood that the inner surfaces of outer housing 110 and the outer surfaces of filter assembly 120 are periodically cleaned and re-coated with the non-volatile adhesive to remove the captured particulate matter 16 and refresh filter 100.

Referring still to FIGS. 2 and 3, outer housing 110 has a central or longitudinal axis 115, a first or upper end 110a, a second or lower end 110b axially opposite end 110a, and an inner cavity 111 extending axially between ends 110a, 110b. In this embodiment, outer housing 110 includes a tubular body 112, an upper cap 113 removably coupled to the upper end of body 112, and a lower cap 114 removably coupled to the lower end of body 112. Caps 113, 114 define upper end 110a and lower end 110b, respectively, of outer housing 110. Body 112 and caps 113, 114 are coaxially aligned, and share the same central axis 115 as outer housing 110. In this embodiment, outer housing 110 is vertically oriented such that central axis 115 is also vertically oriented, and thus, relative axial positions relative to axis 115 are also relative vertical positions.

In this embodiment, upper cap 113 and lower cap 114 are removably coupled to the upper and lower ends, respectively, of body 112 via mating threads. In particular, tubular body 112 is a cylindrical tubular having an externally threaded upper end, an externally threaded lower end, and an inner cylindrical surface 116 extending axially between its upper and lower ends. Caps 113, 114 are cup-shaped and have inner surfaces comprising internal threads that mate and engage the external threads at the upper and lower ends, respectively, of body 112. Although caps 113, 114 are releasably attached to the ends of body 112 in this embodiment, in other embodiments, the caps (e.g., caps 113, 114) are releasably attached to the body (e.g., body 112) with different mechanisms.

Caps 113, 114 close off body 112 at its upper and lower ends, respectively, and together with body 112 define inner cavity 111 of outer housing 110. Due to the cylindrical tubular shape, body 112 has a cylindrical inner surface 116 extending axially between its upper and lower ends and an inner diameter $D_{112}$. In one exemplary embodiment, outer housing 110 has a height measured axially between ends 110a, 110b of about 6 inches, an outer diameter of 2.375 inches, and an inner diameter $D_{112}$ of 2.067 inches.

As best shown in FIG. 2, upper cap 113 includes a first port 117 extending radially therethrough and a second port 118 extending radially therethrough. In this embodiment, ports 117, 118 are diametrically opposed, and thus, are angularly spaced 180° apart about central axis 115. As will be described in more detail below, sample gas from conditioner 20 (after removal of fluid contaminants 14) enters filter 100 and outer housing 110 via first port 117, undesirable particulate matter 16 in the sample gas is captured within filter 100, and the resulting conditioned gas 17 (after removal of particulate matter 16) exits filter 100 and outer housing 110 via second port 118. As will be described in more detail below, filter 100 captures and retains the particulate matter via adhesion of the particulate matter along surfaces within filter 100. Accordingly, filter 100 may also be referred to herein as an "adsorption" filter with the understanding that the term "adsorption" refers to the adhesion of solids particulate matter on or along the surface of a structure.

Figure 4:
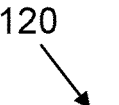
FIG. 4 is a side view of the filter assembly of FIG. 2.

Referring now to FIGS. 2-4, filter assembly 120 includes a sample supply conduit 121, a plurality of axially-spaced pairs or sets 130 of filter discs 131 slidably mounted to conduit 121, a plurality of axially-spaced spacers 140 slidably mounted to conduit 121 between sets 130 of filter discs 131, and a top hat 150 slidably mounted to conduit 121 above sets 130 of filter discs 131 and spacers 140. As will be described in more detail below, supply conduit 121 communicates sample 13 to adsorption filter 100, and within cavity 111, filter discs 131 and top hat 150 aid in capturing the particulate matter 16 in sample 13. Spacers 140 support filter discs 131 and top hat 150 on conduit 121, and maintain the axial spacing of the sets 130 of filter discs 131 and top hat 150. In this embodiment, three sets 130 of filter discs 131 are provided in filter assembly 120, however, in general, any suitable number of sets 130 of filter discs 131 can be employed (e.g., one set 130 of filter discs 131, two sets 130 of filter discs 131, or more).

Sample supply conduit 121 is an elongate tubular pipe or conduit including an inlet end 121a and an outlet end 121b. In this embodiment, supply conduit 121 is L-shape, and thus, includes a first linear section 122 extending from inlet end 121a and a second linear section 123 extending linearly from outlet end 121b to first linear section 122. In this embodiment, sections 122, 123 are oriented at 90° relative to each other. Sections 122, 123 can be integral with each other, or separate components that are connected together to form supply conduit 121. In embodiments described herein, supply conduit 121 has an inner diameter ranging from ⅛ in. to ¼ in.

As shown in FIG. 2, first linear section 122 extends radially through first port 117 into inner cavity 111 proximal upper end 110a and second linear section 123 extends axially downward from first linear section 122 through inner cavity 111 toward lower end 110b. Thus, inlet end 121a and a portion of first section 122 extending from inlet end 121a are disposed outside outer housing 110, while the remaining portion of first section 122 is disposed within inner cavity 111. Second section 122 is entirely disposed within inner cavity 111. An annular seal is provided between first linear section 122 and upper cap 113 to prevent the flow of fluids therebetween.

In this embodiment, second linear section 123 is coaxially aligned with central axis 115, and thus, extends axially down the center of outer housing 110. Outlet end 121b is axially positioned proximal lower end 110b of outer housing 110, but is axially spaced therefrom by a sufficient distance to allow diffuser 160 to be axially positioned within cavity 111 between lower cap 114 and outlet end 121b.

Figure 5A:
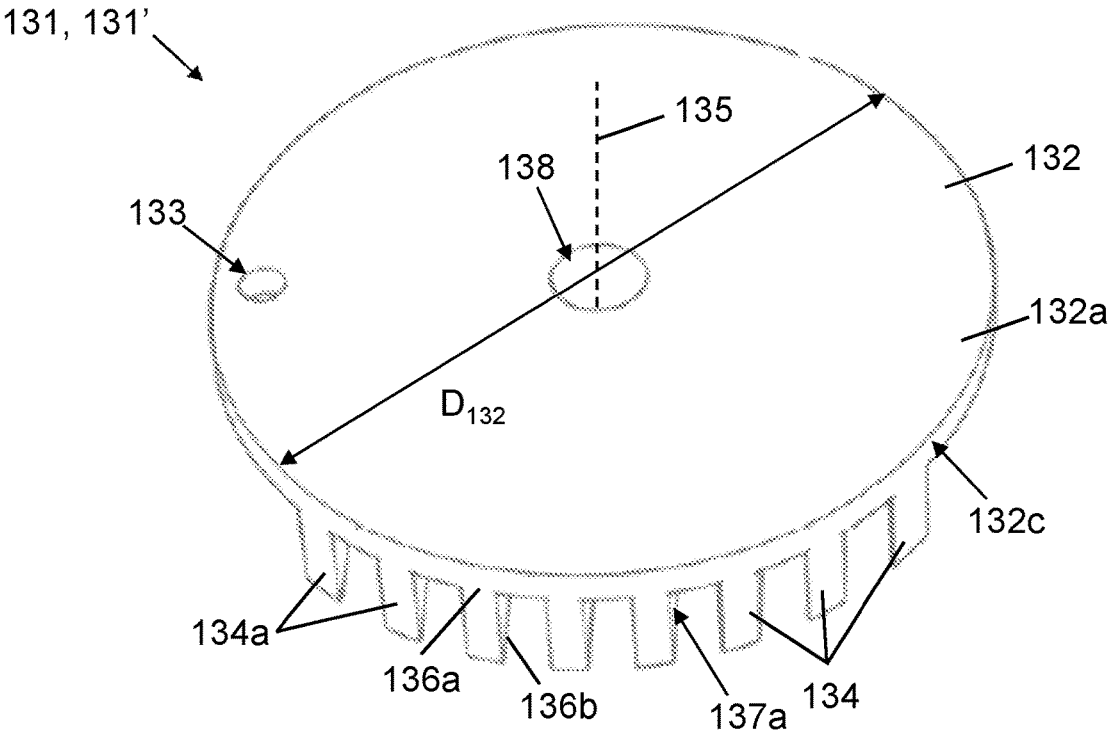
FIGS. 5A and 5B are perspective top and bottom views, respectively, of one pair of filter discs of the filter assembly of FIG. 2.
Figure 5B:
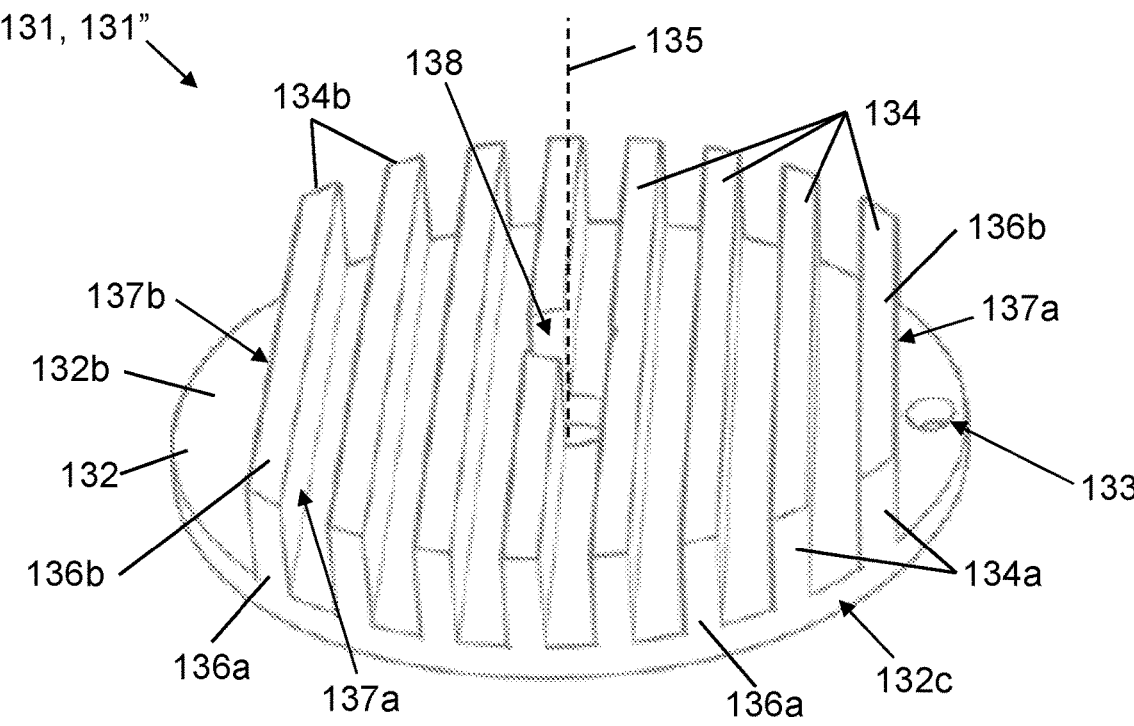
Figure 6:
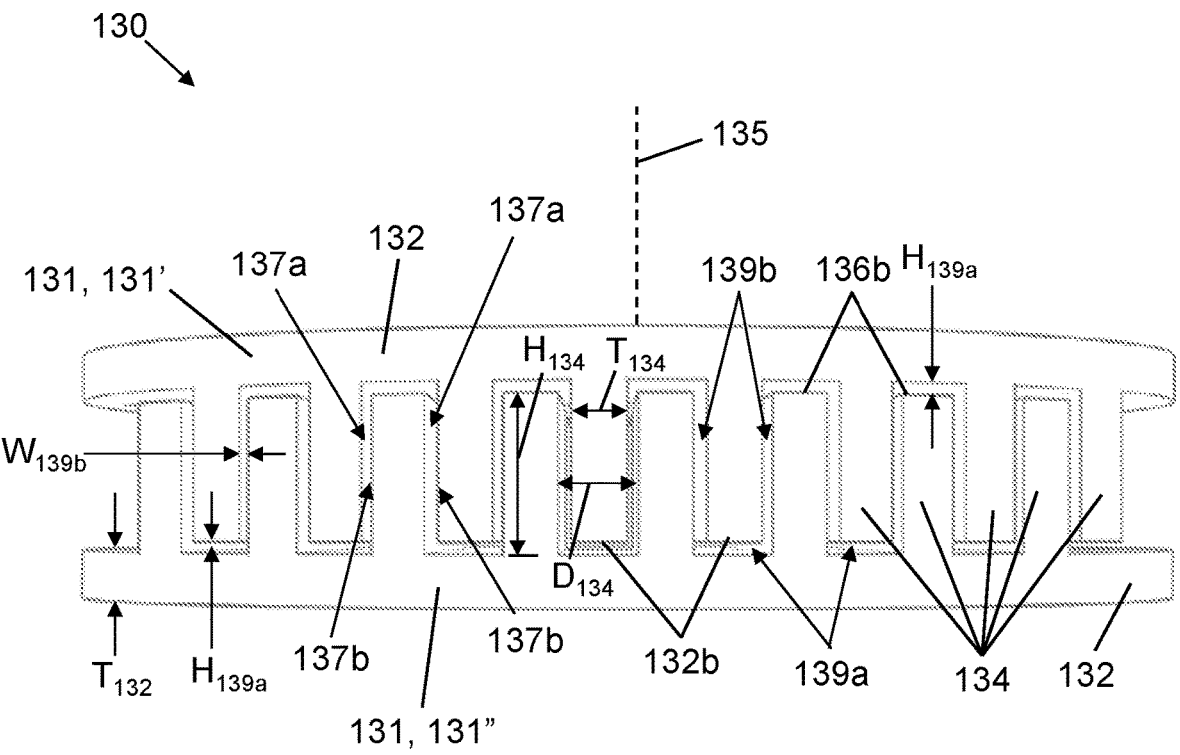
FIG. 6 is an enlarged side view of one pair of filter discs of the filter assembly of FIG. 2.

Referring now to FIGS. 5A, 5B, and 6, one set 130 of filter discs 131 will be described it being understood that each set 130 of filter discs 131 is the same. In this embodiment, the set 130 of filter discs 131 includes two filter discs 131, with one filter disc 131 being positioned above the other filter disc 131. Accordingly, for purposes of clarity and further explanation, the two filter discs 131 in set 130 may also be referred to as a first or upper filter disc 131' and a second or lower filter disc 131". Each filter disc 131', 131" has a central axis 135 that is coaxially aligned with axis 115 of housing 110 when filter assembly 120 is disposed in cavity 111 of outer housing 110. In addition, each filter disc 131', 131" includes a base 132, a plurality of laterally spaced, parallel, elongate flow diverters 134 extending axially from base 132, and a central cylindrical through bore 138 extending axially through base 132 and any flow diverters 134 that extend across the center of base 132. The diameter of bore 138 is substantially the same as the outer diameter of second linear section 123 of supply conduit 121 such that filter discs 131', 131", and in particular bases 132 of filter discs 131', 131", slidingly engage linear section 123, thereby preventing fluid flow therebetween when filter discs 131', 131" are mounted to supply conduit 121.

Base 132 is a flat, circular disc having a planar upper surface 132a, a planar lower surface 132b oriented parallel to upper surface 132a, and a radially outer cylindrical surface 132c extending axially between upper and lower surfaces 132a, 132b. In addition, base 132 includes a flow orifice 133 extending axially therethrough and positioned proximal the radially outer periphery of base 132. More specifically, flow orifice 133 is radially positioned between one of the laterally outermost flow diverters 134 and the radially outer surface 132c. As best shown in FIGS. 2, 5A, and 5B, flow orifices 133 of filter discs 131', 131" are angularly spaced 180° apart about axes 115, 135, and thus, are generally disposed on opposite lateral sides of filter assembly 120. In embodiments described herein, each flow orifice 133 has the same diameter that ranges from $\frac{1}{16}^{th}$ in. to $\frac{3}{8}^{th}$ in. In this embodiment, the diameter of each flow orifice 133 is $\frac{1}{8}^{th}$ in. Base 132 has an outer diameter $D_{132}$ that is substantially the same as inner diameter $D_{112}$ of housing 112 such that outer cylindrical surface 132c slidingly engages cylindrical inner surface 116 of body 112, thereby preventing fluid flow therebetween when filter assembly 120 is disposed in outer housing 110.

Referring still to FIGS. 5A, 5B, and 6, each flow diverter 134 is a generally rectangular wall extending perpendicularly from the same side of base 132. For upper filter disc 131', flow diverters 134 extend downward from lower surface 132b, and for lower filter disc 131", flow diverters 134 extend upward from upper surface 132a. Each flow diverter 134 has a first end 134a, a second end 134b opposite first end 134a, a fixed side 136a extending between ends 134a, 134b and integral with base 132, and a free side 136b extending between ends 134a, 134b distal base 132. In addition, each flow diverter 134 has planar, parallel lateral side surfaces 137a, 137b extending between ends 134a, 134b and sides 136a, 136b. Ends 134a, 134b have generally cylindrical surfaces that are contiguous with outer cylindrical surface 132c of base 132 and disposed at the same diameter $D_{112}$ as outer cylindrical surface 132c of base 132. Accordingly, the cylindrical surfaces at ends 131a, 134b of each flow diverter 134 slidingly engage cylindrical inner surface 116 of body 112, thereby preventing fluid flow therebetween when filter assembly 120 is disposed in outer housing 110.

As best shown in FIG. 6, flow diverters 134 are sized, shaped, and positioned such that flow diverters 134 of filter discs 131', 131" of set 130 are oriented parallel to each other and intermesh when mounted to supply conduit 121. In other words, flow diverters 134 of upper filter disc 131' and flow diverters of lower filter disc 131" are laterally arranged in an alternating fashion in set 130. With the exception of the laterally outermost flow diverters 134 shown in FIG. 6 (i.e., the right most flow diverter 134 of upper filter disc 131' in FIG. 6 and the left most flow diverter 134 of lower filter disc 131" in FIG. 6), each flow diverter 134 of upper filter disc 131' is laterally positioned between a pair of laterally adjacent flow diverters 134 of lower filter disc 131", and each flow diverter 134 of lower filter disc 131" is laterally positioned between a pair of laterally adjacent flow diverters 134 of upper filter disc 131'. Consequently, free sides 136b of flow diverters 134 of upper filter disc 131' are positioned axially proximal base 132 of lower filter disc 131", free sides 136b of flow diverters 134 of lower filter disc 131" are positioned axially proximal base 132 of upper filter disc 131', and planar side surfaces 137a, 137b of flow diverters 134 of upper filter disc 131' face and are proximal to planar side surfaces 137b, 137a, respectively, of flow diverters 134 of lower filter disc 131". However, free sides 136b of flow diverters 134 of upper filter disc 131' are axially spaced from base 132 of lower filter disc 131", free sides 136b of flow diverters 134 of lower filter disc 131" are axially spaced from base 132 of upper filter disc 131', and planar side surfaces 137a, 137b of flow diverters 134 of upper filter disc 131' are laterally spaced from planar side surfaces 137b, 137a, respectively, of flow diverters 134 of lower filter disc 131". Accordingly, flow paths or gaps 139a are provided between free sides 136b of flow diverters 134 of filter discs 131', 131" and bases 132 of filter discs 131", 131', respectively, and flow paths or gaps 139b are provided between planar side surfaces 137a, 137b of laterally adjacent flow diverters 134 of filter discs 131', 131". To maintain the axial spacing of filter discs 131', 131" such that free sides 136b of interleaved flow diverters 134 remain axially spaced from bases 132, small axial standoffs or spacers may be provided between free sides 136b and bases 132 at ends 134a, 134b of flow diverters 134.

Gaps 139a, 139b between filter discs 131', 131" are in fluid communication with each other and with flow orifices 133 of filter discs 131', 131". As will be described in more detail below, during filtering operations, sample 13 flows upward through flow orifice 133 in lower filter disc 131", then flows vertically and laterally through gaps 139a, 139b to the flow orifice 133 in upper filter disc 131', and then flows vertically upward through the flow orifice 133 in upper filter disc 131'. The arrangement of flow diverters 134 and gaps 139a, 139b defines a tortuous flow path for sample 13 between filter discs 131', 131", which generally results in turbulent flow of sample 13 (e.g., Reynolds number greater than 4,000) through gaps 139a, 139b between filter discs 131, 131".

Referring still to FIG. 6, each gap 139a has a height $H_{139a}$ measured axially between the corresponding free end 136b and each gap 139b has a width $W_{139b}$ measured laterally between opposed planar side surfaces 137a, 137b. In general, gaps 139a, 139b are sized to achieve the desired flow characteristics of sample 13 passing therethrough during sampling operations to ensure sufficient capture and retention of particulate matter 16 from sample 13. In embodiments described herein, the height $H_{139a}$ of each gap 139a ranges from $\frac{1}{16}^{th}$ in. to $\frac{3}{8}^{th}$ in. and the width $W_{139b}$ of each gap 139b ranges from $\frac{1}{16}^{th}$ in. to $\frac{3}{32}^{nd}$ in. In this embodiment, the height $H_{139a}$ of each gap 139a is the same, and in particular, is $\frac{1}{8}^{th}$ in.; and the width $W_{139b}$ of each gap 139b is the same, and in particular is $\frac{1}{16}^{th}$ in.

In general, the geometry and size of bases 132 and flow diverters 134 of filter discs 131', 131" can be adjusted to achieve the desired heights $H_{139a}$ of gaps 139a and widths $W_{139a}$ of gaps 139b (and associated flow characteristics therethrough), while simultaneously ensuring filter discs 131', 131" remain rigid (i.e., do not flex) during flow of sample 13 therebetween. For example, as shown in FIG. 6, each base 132 has a thickness $T_{132}$ measured axially between planar surfaces 132a, 132b; each flow diverter 134 has a height $H_{134}$ measured axially from fixed side 136a and base 132 to free side 136b; each flow diverter 134 has a thickness $T_{134}$ measured laterally between the planar side surfaces 137a, 137b; and each pair of laterally adjacent flow diverters 134 on the same filter disc 131', 131" are laterally spaced apart by a distance $D_{134}$ measured laterally between the adjacent flow diverters 134. In embodiments described herein, the thickness $T_{132}$ of base 132 ranges from $\frac{1}{16}^{th}$ in. to $\frac{1}{8}^{th}$ in. In this embodiment, the thickness $T_{132}$ of each base 132 is the same, and in particular, the thickness $T_{132}$ of each base 132 is $\frac{1}{8}^{th}$ in. In embodiments described herein, the height $H_{134}$ of each flow diverter 134 ranges from $\frac{1}{8}^{th}$ in. to $\frac{1}{2}$ in. In this embodiment, the height $H_{134}$ of each flow diverter 134 is the same, and in particular, the height $H_{134}$ of each flow diverter 134 $\frac{1}{4}^{th}$ in. In embodiments described herein, the thickness $T_{134}$ of each flow diverter 134 ranges from $\frac{1}{16}^{th}$ in. to $\frac{1}{8}^{th}$ in. In this embodiment, the thickness $T_{134}$ of each flow diverter 134 is the same, and in particular, the thickness $T_{134}$ of each flow diverter 134 is $\frac{1}{8}^{th}$ in. In embodiments described herein, the distance $D_{134}$ between each pair of adjacent flow diverters 134 of the same filter disc 131', 131" ranges from $\frac{1}{4}^{th}$ in. to $\frac{3}{8}^{th}$ in. In this embodiment, the distance $D_{134}$ between each pair of adjacent flow diverts 134 of the same filter disc 131', 131" is the same, and in particular, the distance $D_{134}$ between each pair of adjacent flow diverts 134 of the same filter disc 131', 131" is $\frac{1}{4}^{th}$ in.

Referring again to FIGS. 2-4, top hat 150 is slidably mounted on second linear section 123 of supply conduit 121 above the sets 130 of filter discs 131 and above the spacers 140. In this embodiment, top hat 150 is a flat, circular disc having a central axis 155 coaxially aligned with axis 115, a planar upper surface 150a, a planar lower surface 150b oriented parallel to upper surface 150a, and a radially outer cylindrical surface 150c extending axially between upper and lower surfaces 150a, 150b. Top hat 150 has an outer diameter $D_{150}$ that is substantially the same as inner diameter $D_{112}$ of housing 112 such that outer cylindrical surface 150c slidingly engages cylindrical inner surface 116 of body 112, thereby preventing fluid flow therebetween when filter assembly 120 is disposed in outer housing 110. In addition, top hat 150 includes a central cylindrical through bore 151 extending axially therethrough and a flow orifice 153 extending axially therethrough and positioned proximal the radially outer periphery of base top hat 150. The diameter of bore 151 is substantially the same as the outer diameter of second linear section 123 of supply conduit 121 such that top hat 150 slidingly engage linear section 123, thereby preventing fluid flow therebetween when top hat 150 is mounted to supply conduit 121. As best shown in FIGS. 2 and 3, flow orifice 153 of top hat 150 is angularly spaced 180° apart about axes 115, 135, 155 from flow orifice 133 of the axially adjacent filter disc 131, and thus, such flow orifices 153, 133 are generally disposed on opposite lateral sides of filter assembly 120. In embodiments described herein, each flow orifice 153 has a diameter that ranges $\frac{1}{16}^{th}$ in. to $\frac{3}{8}^{th}$ in. In this embodiment, the diameter of flow orifice 153 is $\frac{1}{8}^{th}$ in.

Referring still to FIGS. 2-4, spacers 140 are axially positioned between top hat 150 and the axially adjacent set 130 of filter discs 131, between each pair of axially adjacent sets 130 of filter discs 131, and immediately axially below the bottom set 130 of filter discs 131. As noted above, spacers 140 are mounted to second linear section 123 of supply conduit 121, maintain the axial spacing of top hat 150 and sets 130 of filter discs 131, and support the weight of top hat 150 and sets 130 of filter discs 131 such that they do not otherwise slide downward off supply conduit 121. In this embodiment, each spacer 140 is the same, and in particular, is an annular sleeve having a central axis 145 coaxially aligned with axes 115, 135, 155, a first or upper end 140a, a second or lower end 140b, a radially outer cylindrical surface 140c extending axially between ends 140a, 140b, and a central cylindrical through bore 141 extending axially therethrough. Each spacer 140 has an outer diameter that is substantially less than the inner diameter $D_{112}$ of housing 112 such that spacer 140 provides minimal resistant to flow of sample 13 between top hat 150 and the axially adjacent set 130 of filter discs 131 or between axially adjacent sets 130 of filter discs 131. The diameter of bore 141 is substantially the same as the outer diameter of second linear section 123 of supply conduit 121 such that each spacer 140 slidingly engage linear section 123, thereby preventing fluid flow therebetween when spacers 140 are mounted to supply conduit 121. In this embodiment, each spacer 140 also include an internally threaded bore extending radially from outer surface 140c to through bore 141, which receives a set screw for fixably (and releasably) mounting spacers 140 to supply conduit 121.

As best shown in FIGS. 2 and 4, each spacer 140 supports the axially adjacent top hat 150 or set 130 of filer discs 131 seated against upper end 150a. With the exception of the lower most spacer 140, the lower end 140b of each spacer 140 is axially abutted by the axially adjacent set 130 of filter discs 131.

Referring now to FIG. 2, diffuser 160 is positioned within inner cavity 111 of outer housing 110 below filter assembly 110. In this embodiment, diffuser 160 has a central axis 165, a first or upper end 160a, a second or lower end 160b, and a radially outer surface 161 extending axially between ends 160a, 160b. The position of diffuser 160 is fixed within cavity 111. In this embodiment, lower end 160b is fixably attached to cap 114. For example, diffuser 160 can be fixably attached to cap 114 before cap 114 is threaded onto body 112.

In embodiments described herein, diffuser 160 has a width measured perpendicular to central axis 165 that continuously increases moving axially from upper end 160a to lower end 160*b* to redirect the axial flow of sample 13 exiting outlet end 121*b* of supply conduit 121 radially outward toward inner surface 116 of body 112. In this embodiment, diffuser 160 has a pyramidal geometry including a pointed tip at upper end 160*a* and a width that increases continuously and linearly moving from upper end 160*a* to lower end 160*b*. However, in other embodiments, the diffuser (e.g., diffuser 160) may have other geometries that increase in width moving axially downward to aid in redirecting the axial flow of sample 13 exiting outlet end 121*b* of supply conduit 121 radially outward toward inner surface 116 of body 112.

Referring again to FIGS. 2-4, adsorption filter 100 is assembled by coating the outer surfaces of top hat 150 and filter discs 131 with the non-volatile adhesive as described above. In general, the adhesive can be applied to top hat 150 and discs 131 by any suitable method including, without limitation, spraying, painting, dipping, or combinations thereof. Next, top hat 150, spacers 140, and sets 130 of filter discs 131 are mounted to second linear section 123 of supply conduit 121 to form filter assembly 120. In particular, outlet end 121*b* of supply conduit 121 is advanced through the central through bores 151, 141, 138; top hat 150, spacers 140, and sets 130 of filter discs 131 are axially advanced along second linear section 123 of supply conduit 121 to the desired axial position; and spacers 140 are fixably secured to second linear section 123 via set screws, thereby holding top hat 150, spacers 140, and sets 130 of filter discs 131 on supply conduit 121 and maintaining the spacing of top hat 150 and sets 130 of filter discs 131 on supply conduit 121. As shown in FIG. 2, top hat 150 is rotationally oriented such that orifice 153 is angularly and radially aligned with second port 118 of outer housing 110; upper filter disc 131' axially adjacent top hat 150 is rotationally oriented such that orifice 133 is angularly offset or spaced from orifice 153 by 180°; and remaining filter discs 131 are rotationally oriented such that orifices 133 in axially adjacent filter discs 131 within a given set 130 and in axially adjacent sets 130 are angularly offset or spaced by 180°. In this embodiment, the adhesive is applied to top hat 150 and filter discs 131 before being mounted to supply conduit 121 to ensure flow diverters 134 and planar surfaces 132*a*, 132*b*, 150*a*, 150*b* are sufficiently coated before flow diverts 134 of filter discs 131', 131" in each set 130 are intermeshed and before top hat 150 and sets 130 of filter discs 131 are pushed toward each other. However, in other embodiments, the adhesive may be applied after assembling filter assembly 120 or both before and after assembling filter assembly 120. It should also be appreciated that the outer surfaces 140*c* of spacers 140 and/or the outer surface of second linear section 123 of supply conduit 121 can be coated with adhesive.

Before, during, or after assembling filter assembly 120, diffuser 160 is fixably secured to lower cap 114, outer surface 161 of diffuser 160 is coated with the adhesive, the inner surfaces of caps 113, 114 are coated with the adhesive, and inner surface 116 of body 112 is coated with the adhesive. Next, first linear section 122 of supply conduit 121 is advanced through first port 117 of upper cap 113, and then filter assembly 120 is advanced into inner cavity 111 with filter discs 131, second linear section 123 of supply conduit 121, and top hat 150 coaxially aligned with body 112 such that outer surfaces 132*c*, 150*c* slidingly engage inner surfaces 116 of body 112. Filter assembly 120 is advanced into body 112 until upper cap 113 axially abuts the upper end of body 112, and then upper cap 113 is threaded onto the upper end of body 112, thereby completing the assembly of adsorption filter 100. It should be appreciated that section 122 of supply conduit 121 extends through first port 117 of upper cap 113, and thus, filter assembly 120 is rotated with upper cap 113 relative to body 112 and lower cap 114 as upper cap 113 is threaded onto body 112.

For purposes of clarity and further explanation, the three sets 130 of filter discs 131 of filter assembly 120 shown in FIG. 2 may also be referred to as first or lower set 130-1, second or intermediate set 130-2, and third or upper set 130-3 with the understanding intermediate set 130 is axially positioned between first set 130 and third set 130. Referring still to FIG. 2, when filter assembly 120 is seated in outer housing 110 to form filter 100, inner cavity 111 is divided into a plurality of axially adjacent chambers or spaces by sets 130 of filter discs 131 and top hat 150. In particular, inner cavity 111 includes a lower chamber or space 111*a* axially positioned between lower set 130-1 of filter discs 131 and lower cap 114, a first intermediate chamber or space 111*b* axially positioned between lower set 130-1 of filter discs 131 and intermediate set 130-2 of filter discs 131, a second intermediate chamber or space 111*c* axially positioned between intermediate set 130-2 of filter discs 131 and upper set 130-3 of filter discs 131, a third intermediate chamber or space 111*d* axially positioned between upper set 130-3 of filter discs 131 and top hat 150, and an upper chamber or space 111*e* axially positioned between top hat 150 and upper cap 113.

Referring still to FIG. 2, the operation of adsorption filter 100 will now be described. Filter 100 receives partially conditioned sample 15 from conditioner 20 via inlet end 121*a* of supply conduit 121 and outputs the mixture of gas 17 to be analyzed via second port 118. The conditioned sample 15 flows through supply conduit 121 and exits supply conduit 121 at outlet end 121*b* into lower chamber 111*a*. The partially conditioned sample 15 exiting outlet end 121*b* is generally flowing axially downward toward upper end 160*a* of diffuser 160. The conditioned sample 15 flows along the outer surface 161 of diffuser 160, which redirects the partially conditioned sample 15 radially outward. The redirected partially conditioned sample 15 impacts the bottom of lower end cap 114 and radially inner surface 116 of body 112 in lower chamber 111*a*, and begins to flow upward toward lower set 130-1 of filter discs 131. Thus, the direction of flow of the partially conditioned sample 15 is essentially reversed 180° within lower chamber 111*a*, which may induce turbulent flow of the partially conditioned sample 15 (e.g., Reynolds number greater than 4,000) within lower chamber 111*a*. As partially conditioned sample 15 flows along the outer surface of diffuser 160, the inner surface of lower cap 114, and inner surface 116 of body 112, some of the particulate matter 16 therein may impact or otherwise contact the adhesive coating such surfaces and adhere thereto, thereby being captured and effectively removed from the partially conditioned sample 15. Any turbulence induced in the flow of the partially conditioned sample 15 in lower chamber 111*a* may enhance the capture and removal of the particulate matter 16 in lower chamber 111*a* of adsorption filter 100.

Referring still to FIG. 2, the partially conditioned sample 15 flowing axially upward in lower chamber 111*a* impacts lower filter disc 131" of lower set 130-1 but cannot bypass lower filter disc 131" of lower set 130-1 except through flow orifice 133. Thus, the partially conditioned sample 15 flowing axially upward in lower chamber 111*a* is generally directed into and through flow orifice 133 of lower filter disc 131" of lower set 130-1 and into the space between filter discs 131', 131" of lower set 130-1. The partially conditioned sample 15 flowing between filter discs 131', 131" of lower set 130-1 cannot bypass upper filter disc 131' of lower set 130-1, and thus, flows through gaps 139*a*, 139*b* between filter discs 131', 131" of lower set 130-1 generally towards flow orifice 133 in upper filter disc 131' of lower set 130-1. The flow of the partially conditioned sample 15 through gaps 139*a*, 139*b* is tortuous as the direction of flow reverses repeatedly as it flows up and down through laterally adjacent gaps 139*b*. The tortuous flow path may induce turbulence in the flow of partially conditioned sample 15 (e.g., Reynolds number greater than 4,000) between discs 131', 131". As partially conditioned sample 15 flows through gaps 139*a*, 139*b*, some particulate matter 16 therein may impact or otherwise contact the adhesive coating surfaces 132*b*, 137*a*, 137*b* and ends 136*b* of discs 131', 131" and adhere thereto, thereby being captured and effectively removed from the partially conditioned sample 15. Any turbulence induced in the flow of the partially conditioned sample 15 may enhance capture and remove of the particulate matter 16 between discs 131', 131". The partially conditioned sample 15 flows through gaps 139*a*, 139*b* between discs 131', 131" of lower set 130-1 and as it generally moves from flow orifice 133 in lower filter disc 131" of lower set 130-1 to flow orifice 133 of upper filter disc 131' of lower set 130-1. Next, the partially conditioned sample 15 flows into and through flow orifice 133 of upper filter disc 131' of lower set 130-1 and into first intermediate chamber 111*b* between lower set 130-1 and intermediate set 130-2 of filter discs 131', 131".

The partially conditioned sample 15 flowing axially upward in first intermediate chamber 111*b* cannot bypass lower filter disc 131" of intermediate set 130-2 or upper filter disc 131' of lower set 130-1, and thus, flows through first intermediate chamber 111*b* between sets 130-1, 130-1 toward flow orifice 133 in lower filter disc 131" of intermediate set 130-2. The flow of partially conditioned sample 15 through first intermediate chamber 111*b* is generally smooth and linear, and thus, such flow may be laminar (e.g., Reynolds number less than or equal to 2,000). As partially conditioned sample 15 flows through first intermediate chamber 111*b*, some particulate matter 16 therein may flow along and contact the adhesive coating surfaces 132*a* of upper filter disc 131' of lower set 130-1 and lower filter disc 131" of intermediate set 130-2 and outer surface 140*c* of spacer 140 positioned in first intermediate chamber 111*b* and adhere thereto, thereby being captured and effectively removed from the partially conditioned sample 15. Indeed, laminar flow of partially conditioned sample 15 through first intermediate chamber 111*b* may enhance the likelihood of particulate matter 16 settling out of partially conditioned sample 15 under the force of gravity. Next, the partially conditioned sample 15 flows into and through flow orifice 133 of lower filter disc 131" of intermediate set 130-2 and into the space between filter discs 131', 131" of intermediate set 130-2. The process described above with respect to flow of partially conditioned sample 15 through lower set 130-1 and first intermediate chamber 111*b* and the capture of particulate matter 16 by the adhesive on the corresponding surfaces generally repeats as the partially conditioned sample 15 flows between filter discs 131', 131" of intermediate set 130-2, through flow orifice 133 in upper filter disc 131' of intermediate set 130-2 into second intermediate chamber 111*c*, through second intermediate chamber 111*c*, through flow orifice 133 in lower filter disc 131" of upper set 130-3 into the space between filter discs 131', 131" of upper set 130-3, between filter discs 131', 131" of upper set 130-3, through flow orifice 133 in upper filter disc 131' of upper set 130-3 into third intermediate chamber 111*d*, and through third intermediate chamber 111*d*.

Referring still to FIG. 2, partially conditioned sample 15 flows through third intermediate chamber 111*d* from flow orifice 133 in upper filter disc 131' of upper set 130-2 to flow orifice 153 in top hat 150, and then through flow orifice 153 into upper chamber 111*e* of inner cavity 111. The partially conditioned sample 15 generally moves axially upward within upper chamber 111*e* toward second port 118. As partially conditioned sample 15 flows through upper chamber 111*d*, some of the particulate matter 16 therein may impact, flow along, or otherwise contact the adhesive coating inner surface 116 of body 112, outer surface of supply conduit 121, and the inner surfaces of upper cap 113 and adhere thereto, thereby being captured and effectively removed from the partially conditioned sample 15.

In the manner described, partially conditioned sample 15 flows through adsorption filter 100 as particulate matter 16 is captured by adhesive coating the surfaces within filter 100, and effectively removed from partially conditioned sample 15. Although embodiments of filter 100 can be configured to capture particulate matter 16 having a variety of different particle sizes, in embodiments described herein, filter 100 is configured to capture particulate matter 16 (e.g., aluminum oxide particles and catalyst fines) having particle sizes greater than or equal to about 0.10 microns.

Partially conditioned sample 15 flows through adsorption filter 100 in response to a pressure differential between inlet end 121*a* of supply conduit 121 and second port 118. In general, the greater the pressure differential between inlet end 121*a* and second port 118, the greater the volumetric flow rate of partially conditioned sample 15 through adsorption filter 100. However, at sufficiently high volumetric flow rates through adsorption filter 100, the quantity of particulate matter 16 removed from partially conditioned sample 15 and retained within filter 100 may be less than desirable. To achieve a suitable balance between volumetric flow rate of partially conditioned sample 15 and removal of particulate matter 16, in embodiments described herein, the pressure drop between inlet end 121*a* of supply conduit 121 and second port 118 is less than 10 psig, and alternatively less than or equal to about 5 psig; and the volumetric flow rate of partially conditioned sample 15 is greater than 500 cc/min, and alternatively greater than or equal to 1,000 cc/min. As more particulate matter 16 is captured and retained within adsorption filter 100, the flow passages therein (e.g., gaps 139*a*, 139*b*) begin to decrease in cross-sectional area and may start to choke and obstruct flow therethrough, thereby increasing the pressure differential between inlet end 121*a* of supply conduit 121 and second port 118. Accordingly, the pressure drop between inlet end 121*a* of supply conduit 121 and second port 118 can be monitored over time and used as a trigger to clean filter 100 to remove the captured particulate matter 16 and recoat the surfaces within filter 100 with fresh adhesive. For example, in an embodiment of filter 100 designed to operate between 3 psig and 7 psig, a pressure drop between inlet end 121*a* of supply conduit 121 and second port 118 that exceeds 7 psig may be used as a trigger to clean and recoat filter 100.

Although the foregoing describes partially conditioned sample 15 flowing through supply conduit 121 into filter 100 and exiting filter 100 via second port 118, it should be appreciated that particulate matter 16 is continuously captured and removed from partially conditioned sample 15 as it flows through filter 100, thereby transitioning partially conditioned sample 15 into the mixture of gas 17 to be analyzed by instrumentation 30. Accordingly, partially conditioned sample 15 is converted to gas 17 within filter 100, which exits adsorption filter 100 via second port 118 and flows to instrumentation 30 for analysis.

As described above, adsorption filter 100 captures and retains particulate matter 16 on the adhesive applied to the inner surfaces of outer housing 110 and the outer surfaces of filter assembly 120. Over time, accumulation of the particulate matter 16 on the adhesive reduces the surface area of adhesive available to capture additional particulate matter, and thus, the ability to capture particulate matter 16 with filter 100 generally decreases over time. Accordingly, filter 100 is periodically removed from system 10, disassembled, cleaned to remove the capture particulate matter 16 and old adhesive, recoated with fresh adhesive, reassembled, and installed back in system 10.

In general, the components of adsorption filter 100 can be made of any rigid material(s) suitable for use with the fluids (e.g., partially conditioned sample 15) and particulate matter (e.g., particulate matter 16) that are passed therethrough. In this embodiment, outer housing 110 is made of stainless steel (e.g., 316 stainless steel), supply conduit 121 is made of 316 stainless steel, and the remaining components of filter assembly 120 (e.g., top hat 150, filter discs 131, and spacers 140) are made of high density polyethylene (HDPE) or glass fiber reinforced nylon for ease of manufacture by 3D printing.

Figure 7:
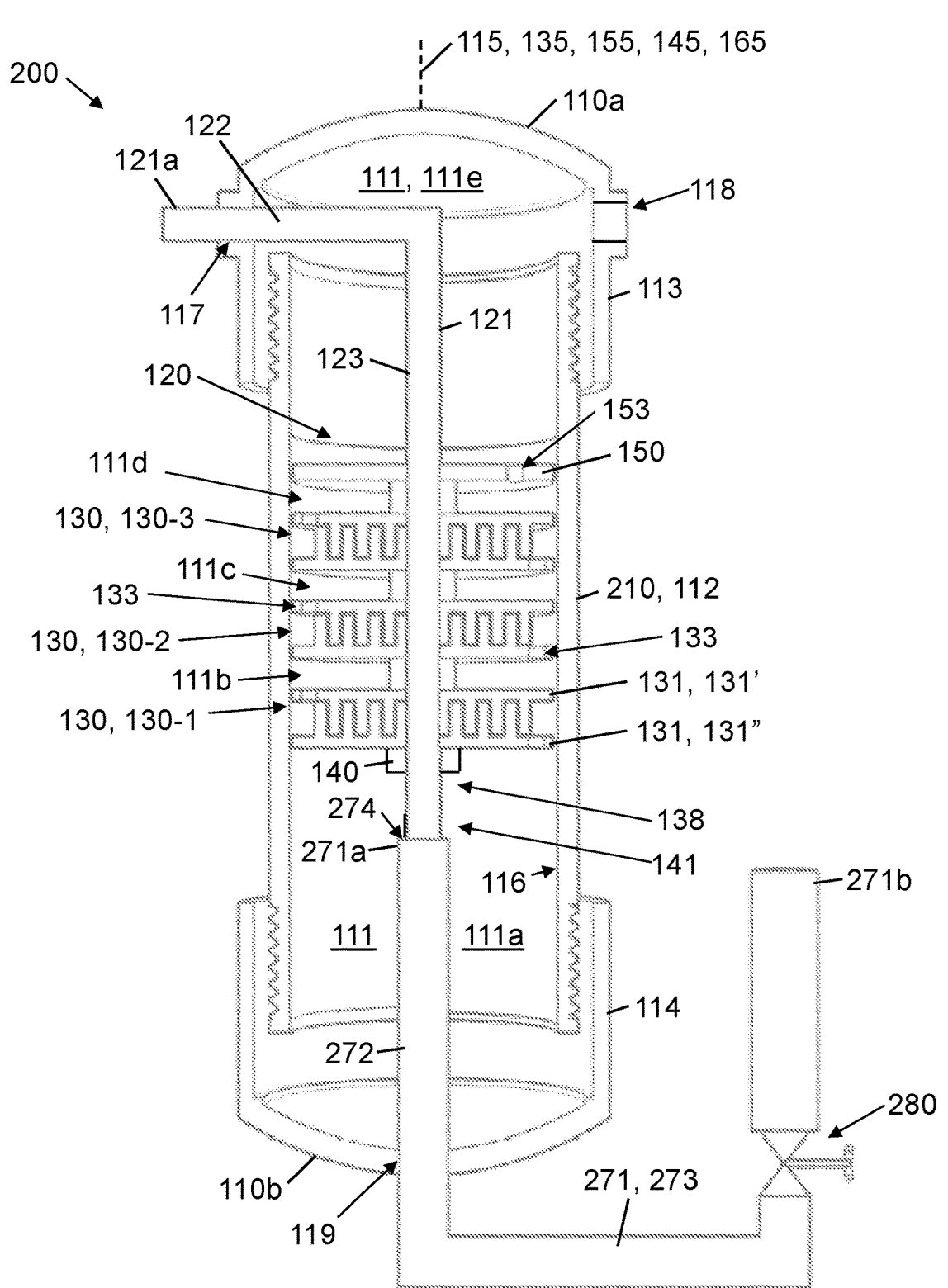
FIG. 7 is a cross-sectional side view of an embodiment of an adsorption filter that can be used in the system of FIG. 1.

At certain times, it may be desirable to selectively adjust, control, or limit the volumetric flow rate of partially conditioned sample 15 passing through the adsorption filter (e.g., adsorption filter 100) to instrumentation 30 (e.g., to avoid unnecessarily and prematurely loading the adsorption filter with particulate matter 16). One way to limit the volumetric flow rate of partially conditioned sample 15 passing through the adsorption filter to instrumentation 30 is to selectively bypass the adsorption filter. Referring now to FIG. 7, an embodiment of an adsorption filter 200 configured to allow selective bypassing of partially conditioned sample 15 is shown. In general, filter 200 can be used in system 10 previously described in place of filter 100. Filter 200 is substantially the same as filter 100 previously described with the exception that filter 200 does not include diffuser 160 and includes bypassing functionality. Accordingly, the differences between filters 100, 200 will be described it being understood the other features are generally the same. In addition, for purposes of clarity and conciseness, like features of filter 100, 200 are given the same reference numerals.

Referring still to FIG. 7, filter 200 includes outer housing 210 and filter assembly 120 disposed in outer housing 210. Filter assembly 120 and the components thereof (e.g., supply conduit 121, sets 130 of filter discs 131, spacers 140, and top hat 150) are as previously described. Outer housing 210 is the same as outer housing 110 previously described with the exception that lower cap 114 of filter assembly 210 includes a through bore 119 extending axially therethrough. Bore 119 is coaxially aligned with second linear section 123 of supply conduit 121 and axes 115, 135, 145, 155, 165. Unlike filter 100 previously described, filter 200 includes a bypass assembly 270 configured to allow a selective portion of the volumetric flow rate of partially conditioned sample 15 to bypass filter 200. The portion of partially conditioned sample 15 that bypasses filter 200 does not flow through chambers 111a, 111b, 111c, 111d or gaps 139a, 139b between filter discs 134, and thus, does not load the adhesive with particulate matter 16 therein.

In this embodiment, bypass assembly 270 includes a bypass conduit 271 and an adjustable choke or flowmeter 280 disposed along conduit 271. Conduit 271 has an inlet end 271a disposed in lower chamber 111a, an outlet end 271b disposed outside inner chamber 111 and housing 210, an inlet section 272 extending axially from inlet end 271a through bore 119, and an outlet section 273 extending from outlet end 271b to inlet section 272. Inlet section 272 is coaxially aligned with second linear section 123 of supply conduit 121 and axes 115, 135, 145, 155, 165. Outlet end 121b of supply conduit 121 is coaxially aligned with and disposed within inlet end 271a of bypass conduit 271. However, outlet end 121b (not visible in FIG. 7) has an outer diameter that is less than the inner diameter of inlet end 271a, and thus, an annulus 274 is radially positioned between ends 121b, 271b. An annular seal is provided between outlet section 273 and lower cap 114 to prevent the flow of fluids therebetween. Outlet section 273 is external outer housing 210. Adjustable flow meter 280 is positioned along outlet section 273, and thus, is external outer housing 210.

Referring still to FIG. 7, adsorption filter 200 operates in a similar manner as adsorption filter 200 previously described with the exception that flowmeter 280 can be adjusted to control the relative quantities of partially conditioned sample 15 that bypasses filter 200 via bypass conduit 271 and that is filtered by filter 200. More specifically, filter 200 receives partially conditioned sample 15 from conditioner 20 via inlet end 121a of supply conduit 121. The conditioned sample 15 flows through supply conduit 121 and exits supply conduit 121 at outlet end 121b into inlet end 271a of bypass conduit 271. Flowmeter 280 is adjusted, as desired, to operate as a choke that creates backpressure within bypass conduit 271. In particular, flowmeter 280 can be adjusted from a fully closed position blocking all of partially conditioned sample 15 exiting supply conduit 121 from flowing through bypass conduit 271 to a fully opened position allowing all of partially conditioned sample 15 exiting supply conduit 121 to flow through bypass conduit 271. Thus, when flowmeter 280 is in the fully closed position, all of partially conditioned sample 15 exiting supply conduit 121 initially passes into inlet end 271a of bypass conduit 271 but is blocked from flowing therethrough, and thus, reverses direction and flows back up through annulus 274 into lower chamber 111a; and when flowmeter 280 is in the fully opened position, all of partially conditioned sample 15 exiting supply conduit 121 passes into inlet end 271a of bypass conduit 271 and flows through bypass conduit 271, flowmeter 280, and outlet end 271b, and thus, completely bypasses filter 200. Flowmeter 280 can be adjusted and set to a partially open position between the fully closed position and the fully open position to create a desired amount of backpressure in bypass conduit 271 to allow a portion of partially conditioned sample 15 exiting supply conduit 121 to pass through bypass conduit 271 and outlet end 271b, thereby bypassing filter 200, while allowing the remaining portion of partially conditioned sample 15 exiting supply conduit 121 to reverse direction and flow back up through annulus 274 into lower chamber 111a. The portion of partially conditioned sample 15 flowing into lower chamber 111a is filtered in the same manner as previously described to capture and remove particulate matter 16, whereas the portion of partially conditioned sample 15 that flows through bypass conduit 271 and exits outlet end 271b bypasses filter 200, and thus, is not filtered by filter 200. Any partially conditioned fluid 15 exiting outlet end 271b can be supplied back to bulk fluid stream 12. In the manner described, bypass assembly 270 and flowmeter 280 can be used to selectively allow none, a desired portion, or all of partially conditioned sample 15 to bypass filter 200.

Although some embodiments shown and described herein are discussed in context of conditioning a decoke fluid sample from a hydrocarbon cracking operation to determine ethylene and/or propylene yields, in general, embodiments described herein may be used to condition other fluid samples In particular, embodiments of adsorption filter 100, 200 may be used where high moisture content, heavy hydrocarbons, particulate matter, and/or combinations thereof may be present in the unconditioned fluid sample and need to be removed prior to analysis. For example, embodiments described herein may be used to remove "green oil" from recycle gas or on a furnace decoke header to remove water and heavy particulates.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An adsorption filter for removing particulate matter from a fluid, the adsorption filter comprising:

an outer housing including an upper end, a lower end, and an inner cavity;

a filter assembly disposed in the inner cavity of the outer housing, wherein the filter assembly comprises:

a supply conduit having an inlet end, an outlet end disposed in the inner cavity, and a linear section extending vertically from the outlet end, wherein the supply conduit is configured to flow the fluid into the inner cavity;

a first pair of filter discs mounted to the linear section of the supply conduit, wherein the first pair of filter discs includes an upper filter disc and a lower filter disc positioned below the upper filter disc;

wherein each filter disc includes a base and a plurality of parallel flow diverters extending from the base, wherein an outer periphery of each base slidingly engages an inner surface of the outer housing that defines the inner cavity, and each flow diverter slidingly engages the inner surface of the outer housing;

wherein each base includes a flow orifice extending vertically therethrough;

wherein the plurality of parallel flow diverters of the upper filter disc extend downward from the base of the upper filter disc and the plurality of parallel flow diverters of the lower filter disc extend upward from the base of the lower filter disc, and wherein the plurality of parallel flow diverters of the upper filter disc intermesh with the plurality of parallel flow diverters of the lower filter disc such that one of the plurality of parallel flow diverters of the upper filter disc extends between each pair of laterally adjacent flow diverters of the plurality of parallel flow diverters of the lower filter disc;

wherein an outer surface of each base and an outer surface of each flow diverter is coated in an adhesive configured to capture the particulate matter.

2. The adsorption filter of claim 1, further comprising a diffuser positioned in the inner cavity below the outlet end of the supply conduit, wherein the diffuser is configured to change a direction of flow of the fluid exiting the outlet end of the supply conduit.

3. The adsorption filter of claim 2, wherein the diffuser has an upper end proximal the outlet end of the supply conduit, a lower end distal the outlet end of the supply conduit, and a width that increases moving vertically from the upper end of the diffuser to the lower end of the diffuser.

4. The adsorption filter of claim 3, wherein the diffuser has an outer surface coated in the adhesive.

5. The adsorption filter of claim 1, wherein the inner surface of the outer housing is coated in the adhesive.

6. The adsorption filter of claim 1, further comprising:

a plurality of pairs of filter discs mounted to the linear section of the supply conduit, wherein the plurality of pairs of filter discs are vertically spaced apart;

wherein each pair of filter discs includes an upper filter disc and a lower filter disc positioned below the upper filter disc;

wherein each filter disc includes a base and a plurality of parallel flow diverters extending from the base, wherein each base and each flow diverter slidingly engages an inner surface of the outer housing;

wherein each base includes a flow orifice extending vertically therethrough;

wherein the plurality of parallel flow diverters of each upper filter disc extend downward from the base of the upper filter disc and the plurality of parallel flow diverters of each lower filter disc extend upward from the base of the lower filter disc, and wherein the plurality of parallel flow diverters of the upper filter disc of each pair of filter discs intermesh with the plurality of parallel flow diverters of the lower filter disc of the pair of filter discs;

wherein an outer surface of each base and an outer surface of each flow diverter is coated in the adhesive.

7. The adsorption filter of claim 6, wherein each filter disc has a central axis, and wherein the central axes of the filter discs of the plurality of pairs of filter discs are coaxially aligned.

8. The adsorption filter of claim 7, wherein the flow orifice of the base of each upper filter disc is angularly spaced from the flow orifice of the base of the corresponding lower filter disc by 180° as measured about the central axes of the filter discs of the plurality of pairs of filter discs.

9. The adsorption filter of claim 8, further comprising a top hat mounted to the linear section of the supply conduit above the plurality of pairs of filter discs, wherein the top hat includes a flow orifice extending vertically therethrough.

10. The adsorption filter of claim 1, further comprising:

a bypass conduit extending through the outer housing, wherein the bypass conduit has an inlet end disposed in the inner cavity of the outer housing and an outlet end external the outer housing, wherein the outlet end of the supply conduit is disposed in the inlet end of the bypass conduit;

a flowmeter disposed along the bypass conduit and configured to choke a flow of the fluid through the bypass conduit.

11. The adsorption filter of claim 1, wherein the outer housing has a vertically oriented central axis;

a plurality of axially spaced pairs of filter discs mounted to the linear section of the supply conduit, wherein each pair of filter discs includes an upper filter disc and a lower filter disc positioned below the upper filter disc;

wherein each filter disc includes a base and a plurality of parallel flow diverters extending from the base, wherein an outer periphery of each base is defined by a radially outer cylindrical surface that slidingly engages a radially inner cylindrical surface of the outer housing, wherein each base of the plurality of axially spaced pairs of filter discs includes a flow orifice extending vertically therethrough;

wherein the flow orifice of each upper filter disc is angularly spaced from the flow orifice of the corresponding lower filter disc relative to the central axis;

wherein each flow diverter has a first end and a second end opposite the first end, wherein the first end of each flow diverter is contiguous with the radially outer cylindrical surface of the corresponding base and slidingly engages the radially inner cylindrical surface of the outer housing and the second end of each flow diverter is contiguous with the radially outer cylindrical surface of the corresponding base and slidingly engages the radially inner cylindrical surface of the outer housing;

wherein the plurality of parallel flow diverters of each upper filter disc extend axially from a lower surface of the corresponding base and the plurality of parallel flow diverters of each lower filter disc extend upward from an upper surface of the corresponding base;

wherein the upper surface and the lower surface of each base is coated with the adhesive.

12. The adsorption filter of claim 11, further comprising a top hat mounted to the linear section of the supply conduit axially above the plurality of axially spaced pairs of filter discs, wherein the top hat has an upper planar surface, a lower planar surface oriented parallel to the upper planar surface, a radially outer cylindrical surface that slidingly engages the radially inner cylindrical surface of the outer housing, and a flow orifice extending axially from the upper planar surface to the lower planar surface.

13. The adsorption filter of claim 12, wherein the flow orifice of the top hat is angularly spaced from the flow orifice of the upper filter disc of an axially adjacent pair of filter discs relative to the central axis.

14. The adsorption filter of claim 13, further comprising a diffuser positioned in the inner cavity below the outlet end of the supply conduit, wherein the diffuser is configured to direct a flow of the fluid exiting the outlet end of the supply conduit radially outward toward the radially inner cylindrical surface of the outer housing.

15. The adsorption filter of claim 14, wherein an outer surface of the diffuser and the radially inner cylindrical surface of the outer housing are coated in the adhesive.

16. The adsorption filter of claim 12, wherein each filter disc has a central axis and the top hat has a central axis, and wherein the central axes of the filter discs of the plurality of axially spaced pairs of filter discs and the central axis of the top hat are coaxially aligned with the central axis of the outer housing.

17. The adsorption filter of claim 11, wherein the filter assembly includes a plurality of axially spaced spacers mounted to the linear section of the supply conduit, wherein one spacer is axially positioned between each pair of axially adjacent filter discs, and one spacer is axially positioned between the top hat and an axially adjacent pair of filter discs.

18. The adsorption filter of claim 11, wherein the outer housing includes a first port extending radially therethrough proximal the upper end of the outer housing and a second port extending radially therethrough proximal the upper end of the outer housing;

wherein the supply conduit extends radially through the first port;

wherein the second port is configured to output the fluid from the adsorption filter.

19. The adsorption filter of claim 11, further comprising:

a bypass conduit extending through the lower end of the outer housing, wherein the bypass conduit has an inlet end disposed in the inner cavity of the outer housing and an outlet end external the outer housing, wherein the outlet end of the supply conduit is disposed in the inlet end of the bypass conduit, and wherein an annulus is positioned between the inlet end of the bypass conduit and the outlet end of the supply conduit;

a flowmeter disposed along the bypass conduit and configured to adjust a flow of the fluid through the bypass conduit.

20. The adsorption filter of claim 1, wherein each flow diverter has a first end and a second end opposite the first end, wherein the first end of each flow diverter slidingly engages the inner surface of the outer housing and the second end of each flow diverter slidingly engages the inner surface of the outer housing.

* * * * *